Oct. 17, 1961

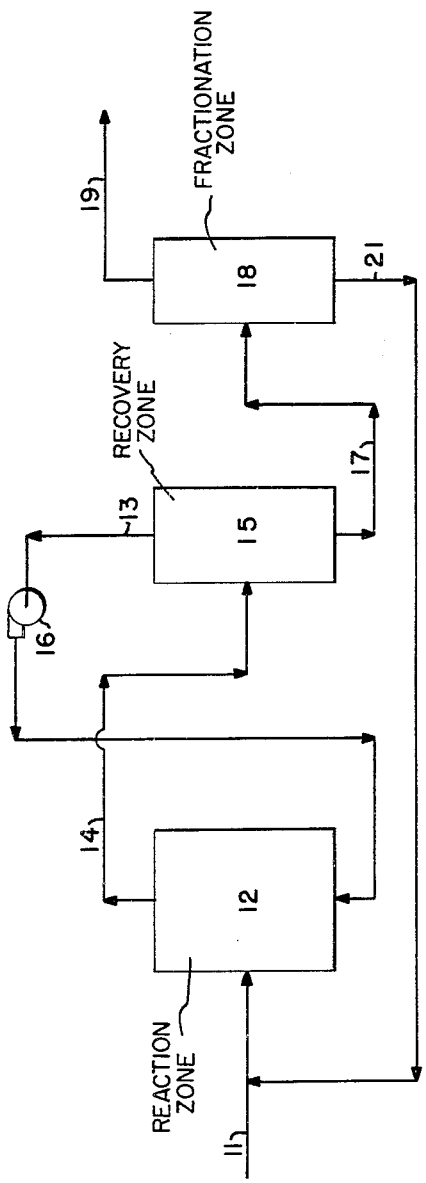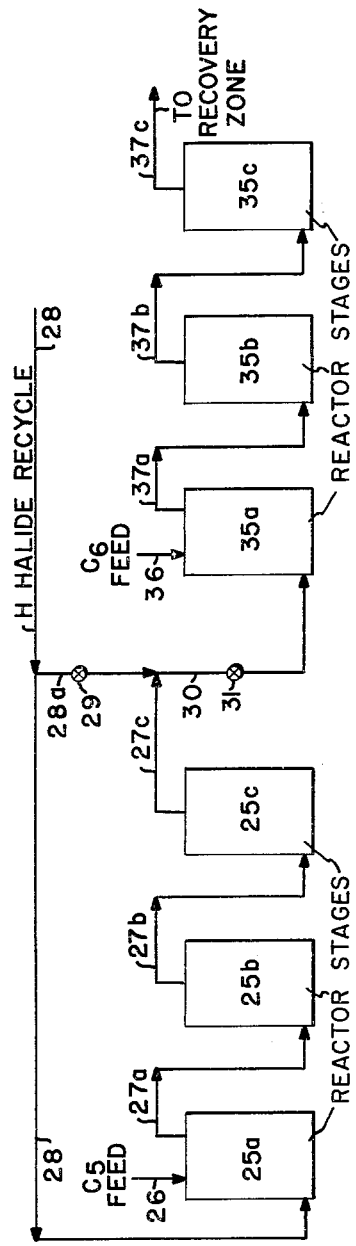

C. N. KIMBERLIN, JR., ET AL 3,005,035
LIQUID PHASE HYDROCARBON ISOMERIZATION
WITH GAS PHASE PRODUCT TAKEOFF

Filed Nov. 3, 1958

Charles Newton Kimberlin, Jr.
Howard Emerson Merrill    Inventors

By *Byron O. Dimmick*    Attorney

3,005,035
LIQUID PHASE HYDROCARBON ISOMERIZATION WITH GAS PHASE PRODUCT TAKEOFF

Charles Newton Kimberlin, Jr., and Howard Emerson Merrill, Baton Rouge, La., assignors to Esso Research and Engineering Company, a corporation of Delaware
Filed Nov. 3, 1958, Ser. No. 771,318
8 Claims. (Cl. 260—683.67)

This invention relates to the catalytic isomerization of paraffin hydrocarbons and is especially concerned with a process wherein product separation from catalyst is effected in a novel manner. The invention is particularly directed to the liquid phase conversion of normal or slightly branched chain paraffin hydrocarbons of from 4 to 7 carbon atoms into commercially valuable, more highly branched isomers with a catalyst comprising aluminum bromide.

The isomerization of paraffin hydrocarbons of from 4 to 7 carbon atoms into corresponding branched chain homologs is well known and constitutes one of the economically important ways in which the petroleum refiner can supply the increased demands for fuels of high octane rating for modern high compression internal combustion engines. For effecting the isomerization, it is convenient to employ certain metal halides, particularly aluminum chloride or aluminum bromide, in conjunction with certain promoters, such as hydrogen chloride, hydrogen bromide or boron fluoride. Insofar as the isomerization of light naphthas is concerned, the lower the temperature of isomerization, within limits, the more favorable is the equilibrium for converting straight chain paraffin hydrocarbons into isomers of high octane rating. Aluminum bromide has been found to be more active than aluminum chloride at lower isomerization temperatures, e.g. in the range of about 40 to about 120° F.

One disadvantage in the use of aluminum bromide for paraffin hydrocarbon isomerization is that it is appreciably soluble in the isomerization products and thus tends to be removed from the reaction zone. Because of this, some practical means must be available for separating the aluminum bromide from the products so that it can be reused in the reaction. In the past, this has involved separation by distillation or percolation of the product through an adsorbent such as bauxite, diatomaceous earth or charcoal, or chilling the product to very low temperatures followed by separation of the halide by filtration.

It is an object of the present invention to provide a new and practical solution to the problem of separating the aluminum bromide catalyst from the products of an isomerization reaction.

In accordance with the present invention, the catalyst recovery problem is overcome by removing the isomerization products from the reaction zone in the form of vapors, thereby causing the aluminum bromide to remain behind in the reaction zone. Removal of the reaction products is effected by cycling through the reactor a stream of a hydrogen halide which sweeps out the lower boiling isomers while leaving the higher boiling straight-chain homologs in the reaction zone.

The reaction conditions for the isomerization of light naphtha fractions in accordance with the present invention will, in general, embrace the use of temperatures in the range of about 40° to about 120° F. and pressures in the range of from about atmospheric to about 200 p.s.i.

It is desirable that the isomerization feed contain no more than a maximum of about 0.1% of aromatics. Benzene is present to the extent of 2 to 6 vol. percent in most naphthas but can be removed from the feed by solvent extraction, extractive distillation, hydrogenation or acid treating. Contacting the feed with an adsorbent, such as a molecular sieve zeolite of 13 A. pore size, for example, may also be used. Pretreatment of the feed to reduce the sulfur content to less than 0.001 wt. percent is likewise desirable.

Although the catalyst may comprise aluminum bromide alone, it is also possible to replace a portion of the bromide with aluminum chloride, using from about 1 to about 3 parts of the chloride for each part of the bromide. It is also desirable to employ an inert carrier on which the catalyst may be deposited or in which the catalyst may be impregnated. Among the supports or carriers that may be employed are included activated carbon, activated alumina, pumice, silica gel, fuller's earth, various activated clays or calcined bauxite. A particularly preferred support is a partially dehydrated calcined bauxite marketed commercially as Porocel. Preferably the catalyst mass comprises from about 5 to 10 wt. percent of aluminum bromide or of mixed aluminum bromide and aluminum chloride supported on, mixed with, or impregnated into the Porocel although percentages up to about 50% may be employed. Partial dehydration to prepare the Porocel for use may include heating for from 2 to 3 hours at 1200° to 1400° F. or from 15 to 18 hours at 900° to 1000° F.

To form the catalyst composition, the aluminum halide may be mixed with the support and the mixture heated to effect impregnation after which loosely held aluminum halide may be removed by heating the mass and passing an inert gas therethrough. Such gases may include nitrogen, carbon dioxide, hydrogen or methane. Alternatively, the support may be impregnated by dissolving the aluminum halide in a suitable solvent such as ethylene dichloride or dioxane and the porous carrier impregnated with this solution followed by heating to remove the solvent and loosely held aluminum halide. Another alternative is to employ a powdered support or promoter, mix the aluminum halide with it, and compress the mixture into pellets.

The process may also be employed using a liquid catalyst complex, such as one comprising aluminum bromide and bromine or chlorine, or aluminum bromide and an alkyl halide, such as butyl bromide.

The nature and objects of the invention and the manner in which it may be practiced will be better understood when reference is made to the accompanying drawings in which:

FIGURE 1 is a schematic flow plan of one process that may be used for practicing the invention;

FIGURE 2 is a flow plan of an alternate process employing a staged reactor system.

Figure 3:
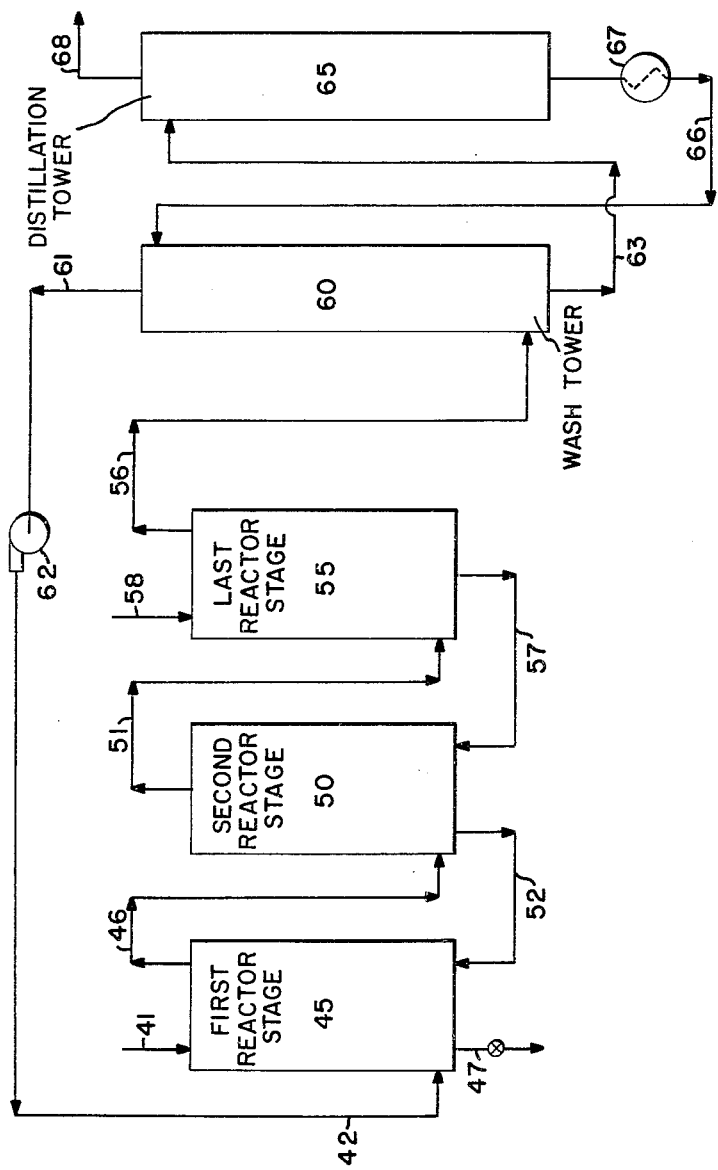
FIGURE 3 is a flow plan of a staged reactor system using a catalyst slurry.

Referring now in particular to FIGURE 1, a hydrocarbon feed comprising $C_5$ to $C_7$ paraffin hydrocarbons, for example, is conducted by means of line 11 into an isomerization zone 12 containing a catalyst comprising aluminum bromide. Reaction zone 12 is maintained at a temperature in the range of 60° to 100° F., for example, and at pressures sufficient to keep the reacting hydrocarbons in the liquid phase. A stream of recycled hydrogen halide, which may comprise hydrogen chloride but which is preferably hydrogen bromide, and which may or may not be diluted with hydrogen, enters the reaction zone through line 13 at such a rate that it serves to remove from the reaction zone the isomerized paraffin hydrocarbons. A stream of recycled gas leaves the reaction zone through line 14 and passes to a recovery zone 15 wherein separation of the isomerized product from the recycled gas is effected. Recovery zone 15 may consist of or include a scrubber, an adsorption zone, a gas compression system or a cooling system, any one of which will serve to remove the isomerized product from the recycled gas stream. The separated recycled gas is returned via line 13 and blower 16 to the reaction zone. The separated isomerization product leaves the separation zone through line 17 and is conducted to a fractionation zone 18 wherein separation of branched chain paraffin hydrocarbon from straight chain hydrocarbon may be effected if it is found that some straight chain hydrocarbon has been removed from the reaction zone with the recycled gas. The isomer will be removed from the fractionation zone via line 19 while separated straight chain paraffin hydrocarbon will be recycled to the reaction zone by means of line 21.

The gas stream that is recycled via line 13 to the reaction zone and back to zone 15 via line 14 may also include light hydrocarbons such as propane or butane which will act as refrigerants for removing reaction heat from the reaction zone. The light hydrocarbon vapors are compressed and cooled to furnish an autorefrigeration medium for the reaction.

The rate of hydrogen bromide circulation required in the process of this invention will depend on the particular hydrocarbon being isomerized. The hydrogen halide circulation rates can be from about 200 to 4000 CF/B. Representative circulation rates for various feed components having conditions of atmospheric pressure and 80° F. temperature are shown in Table I.

*Table I*

HBr CIRCULATION

| Feed Component: | Approximate HBr circulation required, CF/B of hydrocarbon |
|---|---|
| $C_5$ | 200 |
| $C_6$ | 2000 |
| $C_7$ | 4000 |

The arrangement shown in FIGURE 1 is necessarily restricted to the isomerization of a single paraffin hydrocarbon component. However, by the use of a staged reaction zone, a feed containing hydrocarbons of different boiling ranges, such as $C_5$ and $C_6$, may be easily processed. One staging arrangement that may be employed is shown in FIGURE 2. Two groups of staged reactors, 25a, 25b, 25c and 35a, 35b and 35c are provided in tandem. The operation is of course not limited to this particular number of stages but can be conducted with a greater number or with but a single stage in each group. The $C_5$ component is fed by means of line 26 into the initial reactor of the first group, 25a, while the heavier hydrocarbon feed component $C_6$ enters the first stage of the second group of reactors, 35a, by means of line 36. The recycle stream of hydrogen halide in line 28 is split into two streams, one portion entering stage 25a and the second portion entering stage 35a via lines 28a and 30. The recycle gas stream flows through the successive stages until it leaves the final stage by means of line 37c and is sent to the recovery zone.

Instead of splitting the hydrogen halide stream into two portions, all of the recycle stream may be sent through the entire series of staged reactors. This may be accomplished by closing valve 29 and utilizing valve 31 as a pressure reduction valve so that a pressure somewhat above atmospheric, for example 50 to 200 p.s.i.g. may be used in the reactor stages 25a, etc., thus keeping the $C_5$ partial pressure low. The higher boiling $C_6$ fraction may then be treated at a lower pressure, e.g. 0 to 10 p.s.i.g., in the second section of reactors 35a, etc. Thus, by varying the pressures, different proportions of $C_5$ and $C_6$ feeds can be processed.

The process of the present invention may also be applied to a staged reactor system wherein a catalyst slurry or a liquid catalyst complex is employed. One flow plan for accomplishing this is shown in FIGURE 3. A series of at least two reactors is provided connected in tandem. Three such reactors, 45, 50 and 55 are shown in the figure. The feed stream enters the lead reactor 45 through line 41 and is contacted with catalyst slurry or with liquid catalyst entering through line 52. Spent catalyst leaves reactor 45 by means of line 47. A recycle stream of hydrogen bromide, for example, enters reactor 45 through line 42 and sweeps isomerization product from the reactor through line 46 and conducts it into reactor 50 where further contacting takes place with catalyst entering through line 57. Hydrogen bromide and isomerization product leave the second stage through line 51 and are conducted to a third stage 55 where they contact fresh catalyst entering through line 58. Hydrogen bromide and isomerization product leave the last stage through line 56. Thus, there is effected a countercurrent contacting of hydrocarbon and a moving stream of catalyst.

The mixture of hydrogen bromide and isomerization product is conducted into a wash tower 60 wherein the product is absorbed from the recycle gas stream by means of a stream of lean absorber oil, e.g. a light paraffin oil, entering the top of the tower through line 66.

The fat oil (lean oil plus absorbed isomerization product) leaves tower 60 at the bottom through line 63 and is conducted to a distillation tower 65 wherein separation of the isomerized product from the adsorber oil is effected. The isomerized product leaves the tower through line 68 and the recovered lean oil leaves the bottom of the distillation tower through line 66, being cooled by heat exchanger 67 before it returns to the wash tower.

One advantage of the countercurrent contacting arrangement of FIGURE 3 is that there is better utilization of catalyst because of the effective guard chamber action of the first stage in removing catalyst poisons. Another advantage is a reduced requirement for pretreating the feed since the spent catalyst in the lead reactor will also tend to complete the removal of aromatic materials from the feed. As was stated above, the system of FIGURE 3 is easily adapted either to a slurry type of operation or to an operation in which the catalyst is a liquid.

The following example is illustrative of the operation of this invention.

EXAMPLE

A stirred reactor was charged with 40 grams of Porocel, 20 grams of aluminum bromide and 150 grams of a hydrocarbon feed consisting of 67% normal heptane and 33% of methylcyclohexane. Hydrogen bromide gas was passed into the reactor below the surface of the liquid at a rate of about 30 liters per hour and was removed from the reactor and sent to a cold trap receiver. The stream of HBr removed isomerized product from the reactor. Fresh feed was added to the reactor at a rate sufficient to maintain a constant liquid volume in the reactor. The collected product was removed from the receiver at half hour intervals, washed with caustic and analyzed. The results from 7 hours of operation are given in Table II.

*Table II*

[Feed: 67% n-$C_7$—33% MCH, 78° F., atmospheric HBr pressure]

| Time | Percent Conversion n-Heptane to Isoheptanes | V./v./hr. |
|---|---|---|
| 0.5 | 30.9 | .36 |
| 1.0 | 52.4 | .36 |
| 1.5 | 61.1 | .40 |
| 2.0 | 69.4 | .22 |
| 2.5 | 77.1 | .45 |
| 3.0 | 79.0 | .31 |
| 3.5 | 77.5 | .42 |
| 4.0 | 76.7 | .50 |
| 4.5 | 73.9 | .40 |
| 5.0 | 73.0 | .40 |
| 5.5 | 73.0 | .33 |
| 6.0 | 76.1 | .33 |
| 6.5 | 71.8 | .31 |
| 7.0 | 70.8 | .31 |

It will be seen that after the first two hours of operation, which presumably was necessary to establish equilibrium, relatively constant conversion at about the 70% level was maintained throughout the operation.

In practicing the processes of the present invention it is obvious that many variations from the specific illustrations herein presented will occur to those skilled in the art, and such variations are contemplated within the scope of the invention as defined by the appended claims.

What is claimed is:
1. A process for the isomerization of a paraffin hydrocarbon of from 4 to 7 carbon atoms which comprises contacting the said hydrocarbon in the liquid phase in a reaction zone with a catalyst comprising aluminum bromide at a temperature in the range of about 40° to about 120° F., said temperature being below the boiling point of the said hydrocarbon under the conditions existing in the reaction zone, conducting a stream of hydrogen halide at a rate of about 200 to 4000 CF/B. through the reaction zone, removing isomerized product vapors from the reaction zone by means of said hydrogen halide stream as a stream separate from the catalyst, while leaving the higher boiling straight-chain homologs in the reaction zone, and separating isomerization product from the removed hydrogen halide.

2. Process as defined by claim 1 wherein said hydrogen halide comprises hydrogen bromide.

3. A process for the isomerization of a paraffin hydrocarbon of from 4 to 7 carbon atoms which comprises contacting the said hydrocarbon in the liquid phase in a reaction zone with a catalyst comprising aluminum bromide, at a temperature in the range of about 40° to about 120° F., said temperature being below the boiling point of the said hydrocarbon under the conditions existing in the reaction zone, conducting a stream of hydrogen halide at a rate of about 200 to 4000 CF/B. through the reaction zone, removing isomerization product vapors from the reaction zone by means of said hydrogen halide stream, separating hydrogen halide from isomerization product, and recycling hydrogen halide to the reaction zone.

4. A process for isomerizing a mixture of at least two different paraffin hydrocarbons of from 4 to 7 carbon atoms which comprises separating the said mixture into lower boiling and higher boiling components, conducting the lower boiling component into a first reaction zone, contacting said lower boiling component in the liquid phase with a catalyst comprising aluminum bromide in said first reaction zone at a temperature below the boiling point of the said component, conducting the higher boiling component into a second reaction zone, contacting said higher boiling component in the liquid phase with a catalyst comprising aluminum bromide in said second reaction zone at a temperature below the boiling point of the said higher boiling component, conducting a stream of hydrogen halide through said first reaction zone, removing hydrogen halide and isomerization product vapors from said first isomerization zone as a stream separate from said catalyst and conducting them to said second reaction zone, removing hydrogen halide and isomerization product vapors from said second zone, separating hydrogen halide from isomerization products, and recycling hydrogen halide to said reaction zones.

5. Process as defined by claim 4 wherein all of said recycled hydrogen halide is sent to said first zone.

6. Process as defined by claim 4 wherein the recycle stream of hydrogen halide is split into two portions, one portion being conducted to said first reaction zone and the remaining portion to said second zone.

7. A process for isomerizing a paraffin hydrocarbon of from 4 to 7 carbon atoms which comprises conducting said hydrocarbon into a reaction zone, conducting a body of catalyst comprising aluminum bromide into said zone, countercurrently contact said hydrocarbon in the liquid phase with said catalyst in said reaction zone at a temperature below the boiling point of the said hydrocarbon, conducting a stream of hydrogen halide at a rate of about 200 to 4000 CF/B. into said reaction zone, removing isomerization product vapors from the reaction zone by means of said hydrogen halide stream in a stream separate from said catalyst, and separating isomerization product from the removed hydrogen halide.

8. A process for isomerizing a paraffin hydrocarbon of from 4 to 7 carbon atoms which comprises conducting said hydrocarbon into a first of a series of at least two reaction zones, countercurrently contacting said hydrocarbon in the liquid phase in said first reaction zone with a body of catalyst comprising aluminum bromide, conducting a stream of hydrogen halide at a rate of about 200 to 4000 CF/B. into said reaction zone, removing a stream comprising isomerization product vapors from said first reaction zone by means of said hydrogen halide stream, conducting the stream of hydrogen halide and product vapors into a subsequent reaction zone in said series, introducing a body of catalyst comprising aluminum bromide into said subsequent reaction zone, countercurrently contacting hydrocarbon in the liquid phase with said catalyst in said subsequent zone, removing catalyst from said subsequent zone and conducting it to said first reaction zone, removing hydrogen halide and isomerization product vapors from said subsequent zone in a stream separate from said catalyst, and separating isomerization product from said removed hydrogen halide, the temperature in each of said reaction zones being below the boiling point of the hydrocarbon under the conditions existing in such reaction zone.

References Cited in the file of this patent
UNITED STATES PATENTS

| | | |
|---|---|---|
| 2,360,699 | McAllister et al. | Oct. 17, 1944 |
| 2,360,700 | McAllister et al. | Oct. 17, 1944 |
| 2,388,081 | Robertson | Oct. 30, 1945 |
| 2,404,649 | Neuhaus | July 23, 1946 |
| 2,436,367 | Swerdloff | Feb. 17, 1948 |
| 2,530,875 | Gwynn et al. | Nov. 21, 1950 |